Aug. 7, 1962 H. H. FROST ETAL 3,048,847
NONSYMMETRICAL SEISMIC RECORDING
Filed Aug. 24, 1959 2 Sheets-Sheet 1

Aug. 7, 1962     H. H. FROST ETAL     3,048,847
NONSYMMETRICAL SEISMIC RECORDING

Filed Aug. 24, 1959     2 Sheets-Sheet 2

United States Patent Office 3,048,847
Patented Aug. 7, 1962

3,048,847
NONSYMMETRICAL SEISMIC RECORDING
Holloway H. Frost and Stanley N. Heaps, Dallas, Tex., assignors to Socony Mobil Oil Company, Inc., a corporation of New York
Filed Aug. 24, 1959, Ser. No. 835,483
10 Claims. (Cl. 346—1)

This invention relates to storage or recording of time variable signals oscillatory in nature and more particularly to selective emphasis to the character of signals in a plurality of related recordings.

In seismic exploration, a plurality of related seismic signals detected at spaced points along a traverse generally are recorded in side-by-side relation as undulating lines on a photographic chart. In accordance with more recent developments, seismic signals are reproduced in real time and applied to a temporary storage system such as a cathode ray screen wherein persistence permits retention of the signals for a period sufficient for study.

Selective treatment of seismic data in reproducible form permits such modifications as lead to the presentation in a final record section having a desired character. It has been found that there often appears on a seismogram and on seismic record sections coincidence in time between oscillations of similar character which indicate the presence of reflections. In areas where subsurface beds are not horizontal, the dip in the beds is indicated by slight differences in time in a given event from one trace to another. The resultant line-up across a seismograph or record section is thus characterized by a step out in time depending in magnitude upon the magnitude of subsurface dip. It is sometimes found that events line up on a record section indicating dip at a given depth in opposite directions indicating subsurface structure which is highly questionable. In order more clearly to present seismic data, it may be desirable selectively to emphasize a line-up indicating dip in one direction and to de-emphasize line-ups of opposite sense. More particularly, in an area where regional dip is known and interest lies primarily in emphasizing structural features other than regional dip, applicants provide by the present invention a method and means for selectively emphasizing dip of given direction or for selectively de-emphasizing the same.

More particularly, there is provided a method for recording a time variable function on a visual data repository such as a record chart which comprises establishing an asymmetrical recording zone on said chart, producing relative movement between said zone and chart in a first direction in dependence upon a predetermined function of time wherein a line is produced parallel to said first direction. Relative movement is then produced between the recording zone and said chart in a second direction normal to said first direction in dependence upon variations in said time variable function wherein excursions of said zone in a first direction are emphasized disproportionately with respect to excursions in an opposite sense.

In a further aspect of the invention, there is provided a recording system selectively to emphasize on a seismogram indications of subsurface dip which comprises a means for moving a recording chart past a recording zone which extends transversely across said chart. There is also provided means for establishing an area of impression on said chart variable in position in said zone. The area of impression is characterized by asymmetry with respect to the direction of movement of the chart. Means is then provided for producing movement of said area of impression in a manner representative of a seismic signal disproportionately to emphasize excursions in the recording zone of said area of impression in one sense with respect to excursions in said zone of the area of impression in the opposite sense.

For a more complete understanding of the present invention and for further objects and advantages thereof, reference may now be had to the following description taken in conjunction with the accompanying drawings in which.

In recording seismic signals on a photosensitive paper, galvanometers have been employed wherein a beam of light from a suitable source is reflected from a galvanometer mirror and focused onto the recording chart. Ordinarily, the image of the light source impressed on the recording chart is symmetrical with respect to the direction of travel of the recording chart past a given recording area, the latter area comprising the area along the chart to which movement of the galvanometer spot is limited. When this is the case, seismic signals oscillatory in nature are recorded as an undulating line wherein the portion of the line representing an excursion in one direction from a quiescent point is of the same thickness as the portion of the line representing an excursion in the opposite sense where the excursions have the same slope.

Figure 1:
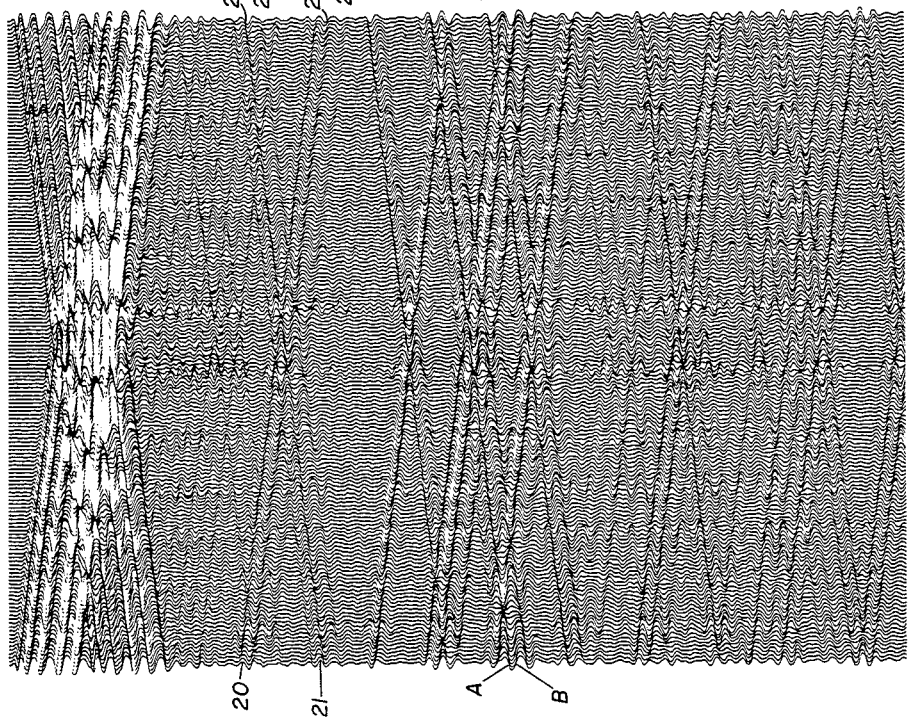
FIG. 1 illustrates a record section produced in accordance with prior art methods.
Figure 2:
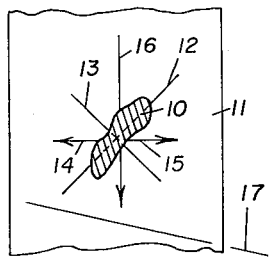
FIG. 2 is a schematic representation of the desired orientations of a recording zone in accordance with the present invention.

Such a recording is illustrated in FIG. 1 wherein upon inspection it will be noted that each of the plurality of traces has the same thickness where deflection is to the right as where deflection is to the left. That is to say, the sides of any given impulse which is symmetrical in time are of uniform thickness. More particularly, the portion A of the left-hand trace of FIG. 1 has the same thickness as the portion B. In accordance with the present invention, there is provided a method and system employing recording in one form with a nonsymmetrical contact area between a recording element and an information storage element or repository. More particularly, as shown in FIG. 2, there is illustrated a zone of impression 10 as between a suitable recording element (not shown) and a record receiving chart 11. The zone of impression 10 may be representative of a spot of light reflected from a galvanometer having a major axis 12 and a minor axis 13. Movement of the zone in response to seismic signals or other oscillatory condition will be limited to the direction of the arrows 14 and 15. Movement of the paper or chart 11 is along the direction indicated by the arrow 16. Movement of the zone 10 in the direction of arrow 14 will produce a relatively broad line as chart 11 moves in direction of arrow 16. In contrast, movement of zone 10 in the direction of arrow 15 will result in a narrower line as chart 11 moves in the direction of arrow 16. By use of such a recording means, those structures which produce line-ups on a seismogram having the same sense as line 17 relative to arrow 16 will be emphasized if the zone 10 is oriented such that the minor axis 13 is displaced from alignment with arrow 16 and toward alignment with line 17 where the major axis would be more nearly perpendicular to line 17. Stated otherwise, for emphasis of dips of any given sense, the minor axis of the zone of impression will be oriented with respect to the recording chart in the same sense as the slope of the line-up across the chart.

While the area 10 of FIG. 2 is illustrated as being of irregular and abstract shape and needs have no particular form in the broadest aspect of the invention, it may be of the form of a rectangle, an ellipse, or other shape. In any case, however, there will be provided a zone of impression which is unsymmetrical with respect to the direction of travel of the paper or chart 11 and to which there may be ascribed a major axis and a minor axis in the sense that those terms are above employed.

Figure 3:
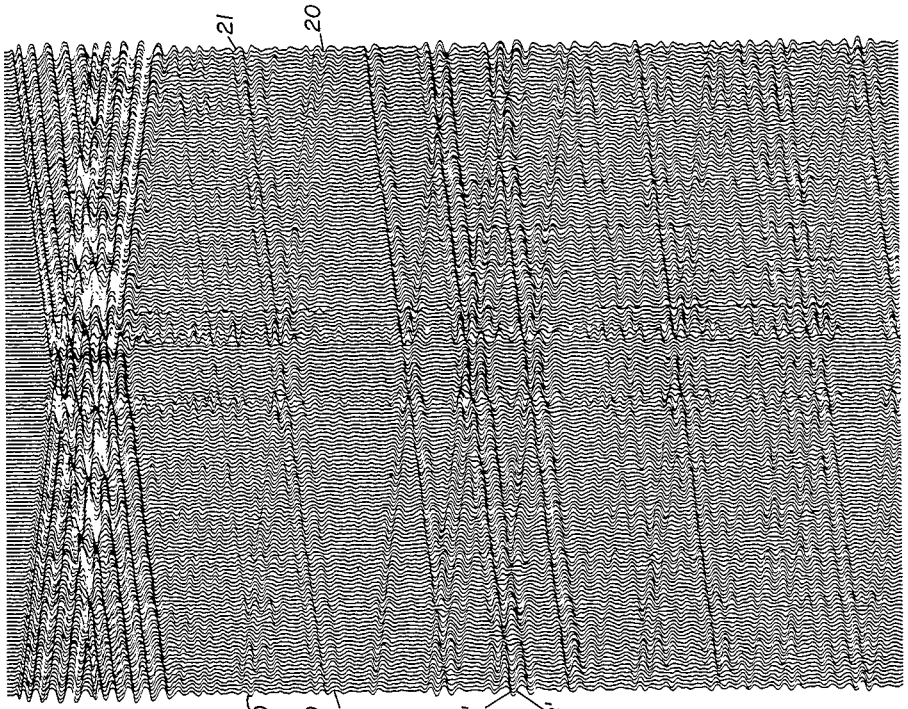
FIG. 3 illustrates a record section produced in accordance with the present invention.

Referring now to FIG. 3, there is illustrated a record section produced in accordance with the present invention. Direct comparison may be had with the section of FIG. 1. More particularly, the segment A' of FIG. 3 is wider than segment B'. It will be noted that in FIG. 1 a line-up 20—20 dipping downward to the right is recorded with emphasis or appearance approximately the same as that of a second line-up 21—21 dipping downward to the left. In order to emphasize the line-up 21—21 relative to the line-up 20—20, such as has been done in FIG. 3, a nonsymmetrical galvanometer spot was employed wherein the minor axis was oriented with displacement away from a line extending longitudinally of the record section of FIG. 3 toward a position in which there would be alignment with the direction of dip of the line-up 21—21. In FIG. 3, it will be noted that line-up 21—21 is far more pronounced than line-up 20—20. This is because there is produced an echelon of closely-spaced, thick portions of each waveform in the line-up 21—21 to produce the appearance of a substantially continuous, darkened zone corresponding with the apparent angle of dip. The same effect will be seen by comparing corresponding waveforms and line-ups throughout the length of the record sections of FIGS. 1 and 3. In each case, line-ups which in FIG. 1 dip downward to the right with bold appearance have, in FIG. 3, been substantially de-emphassized, while line-ups of opposite dip have been substantially emphasized.

Figure 4:
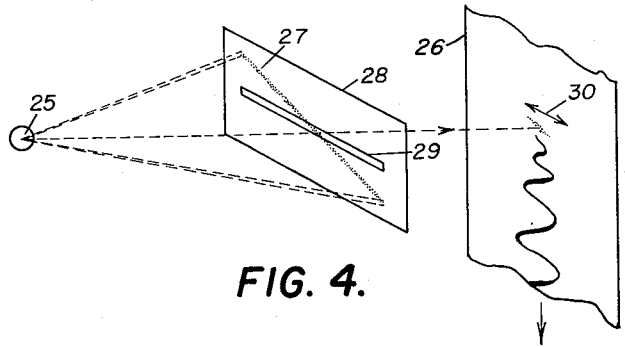
FIG. 4 illustrates an embodiment of the invention employing a galvanometer.

One system for carrying out the present method is illustrated in FIG. 4 wherein a galvanometer 25 is so constructed as to project toward a photosensitive strip 26 an elongated line image 27 which, as shown in FIG. 4, appears on the face of a slotted baffle 28 which is between galvanometer 25 and paper 26. The galvanometer 25 together with slotted baffle 28 may be provided by galvanometer assemblies employed in conjunction with reproduction of 35 millimeter sound tracks. One such galvanometer is the "Modulite" Galvanometer, Type V–A, available from Berndt-Boch, Inc., Holloywood, California. In such a galvanometer, the baffle 28 is rotatably mounted in an assembly so that the slit of light projected thereby may be angularly oriented with respect to any selected axis. Baffle 28 is provided with an elongated slit or aperture 29 which is parallel to the direction of movement of the beam 27 from galvanometer 25. The latter direction is indicated by the arrow 30 on chart 26. As a result of the cooperation between the beam of light from galvanometer 25 and the slot in baffle 28, there is projected onto chart 26 an illuminated contact or exposure area for exposure of the chart. The illuminated area is not symmetrical with respect to the direction of travel of the chart 26. As a result, there is produced an exposure of chart 26 which when suitably processed results in a line or trace in which excursions in one sense are emphasized relative to the excursions of another sense.

Figure 5:
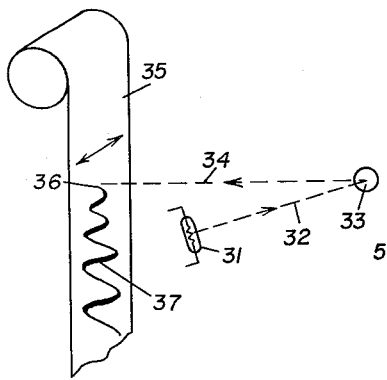
FIG. 5 illustrates an embodiment of the present invention employing a line filament light source.

In FIG. 5, a further modification of the invention is illustrated wherein a long, thin filament in a lamp 31 is employed to provide a light beam which is projected along path 32 to a galvanometer 33 and thence by way of path 34 to the photosensitive chart 35. The lamp 31 and the galvanometer 33 may be provided by an integral unit of the type employed in the embodiment of FIG. 4. The filament is so oriented by rotation of the assembly with respect to the direction of movement of the chart 35 that when the light beam is projected and focused onto chart 35, it appears as a fine line 36 which is unsymmetrical with respect to the direction of travel of chart 35 so that upon deflection there will be produced a trace generally represented by the line 37, of thick and thin portions.

Figure 6:
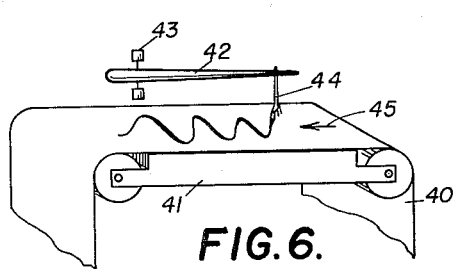
FIG. 6 illustrates the invention embodying a direct recording system.

In another embodiment of the invention a direct recording system is shown in diagrammatic form in FIG. 6 wherein a record chart 40 is driven over a platen 41. A suitable recording system is employed including a pen-carrying arm 42 pivoted as at a support 43. The end of the arm 42 supports a suitable brush 44 which contacts paper chart 40 and when suitably inked serves directly to record a function representative of rotation of the arm 42. It will be apparent that a pen may be used in place of brush 44 as a writing element. In either case, the writing element, as in the case of brush 44, has a contact configuration which is not symmetrical with respect to arrow 45.

Figure 7:
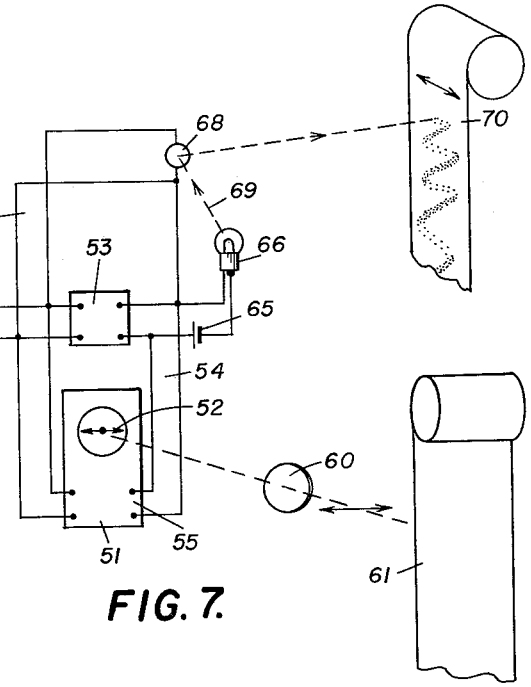
FIG. 7 illustrates two further embodiments of the invention.

Further, in FIG. 7 one mode of employing the present invention in connection with the cathode ray type presentation is illustrated. Seismic signals applied to input terminals 50 actuate an oscilloscope 51. If applied to the horizontal deflection plates only, the galvanometer beam will move along the line represented by arrow 52 on the face of the oscilloscope in proportion to seismic signals. The seismic signals are also applied to a differentiating unit 53 whose output is connected by way of channel 54 to the intensity control terminal 55 of the oscilloscope. More particularly, when the seismic sinal is differentiated, a voltage of a first polarity will be produced upon excursions in one sense, for example, upon excursions to the left as viewed in FIG. 3. The voltage of the opposite sense will be generated upon excursions to the right. The latter voltage may then be combined with the intensity control voltage for the oscilloscope so that the electron beam in the oscilloscope will vary in intensity depending upon the sign of the first derivative of the seismic signal. By this means the spot on the oscilloscope face will be brighter for deflecting in one sense than upon deflecting in the other sense as controlled by the differentiating signal. A camera may then be employed to record the signals of the oscilloscope 51. A camera is diagrammatically represented in FIG. 7 as including a lens 60 and a film 61 which is moved during recording in a direction sensibly normal to the direction of motion of spot 52.

The differentiated signal output from differentiator 53 may also be employed in connection with the galvanometer recording system. More particularly, the output terminals of unit 53 are connected by way of battery 65 to a galvanometer lamp 66. The battery 65 biases the lamp 66 to a normal intensity. The intensity of the light is then modulated with reference to the level determined by battery 65 in dependence upon the output of the signal differentiator 53. Depending upon the selection of circuit, parameter, and connections, a positive excursion in the voltage applied to terminals 50 may cause the intensity of light from lamp 66 to increase. A negative excursion of the seismic signals may cause the intensity of the light from lamp 66 to decrease. Seismic signals are then applied by way of channel 67 to galvanometer 68 to deflect the beam 69 from lamp 66 onto the chart or recording paper 70 in synchronism with variations in intensity of the light beam.

Figure 8:
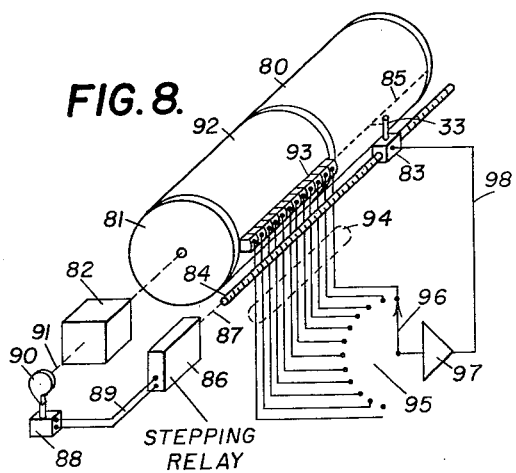
FIG. 8 illustrates a seismic section printing system.

In order to produce record sections of the type illustrated in FIGS. 1 and 3, it has been found desirable to employ a drum-type recording system such as illustrated in FIG. 8 wherein a record receiving chart 80 is mounted on a drum 81. Drum 81 is driven by a motor 82, preferably at a constant speed. A recording element such as the galvanometer 33 of FIG. 5 is mounted on a carrier 83. The carrier 83 is supported by an element 84, a threaded rod, for movement along a line parallel to the axis of drum 81. As the drum 81 is rotated, a light beam is projected onto the recording chart 80 at selected points at the location of the dotted line 85 to establish recording zones along the width of the chart. The chart then is rotated cyclically past the recording zone to receive impressions thereon.

In preparing record sections, the carrier 83 is moved stepwise along the length of element 84 for registration successively with the location of each of the spaced-apart recording zones. For this purpose, a stepping relay 86 is employed coupled to element 84 as by mechanical connection 87. The stepping relay may then be actuated under the control of a cam-operated switch 88 from which there extends a control circuit 89 leading to the stepping relay 86. A cam 90 mounted on shaft 91 of motor 82 serves to close switch 88 once for each revolution of the drum 81. Preferably, the carrier 83 is moved from one location to the next at the end of each seismic signal produced from a reproducible multisignal seismogram 92, also mounted on drum 81. A plurality of reading heads or detectors 93 spaced along the record 92 are connected by way of signal channels 94 to terminals of a stepping switch 95. All signals on seismogram 92 are reproduced cyclically. The selector arm 96 of the stepping switch 95 is also actuated under the control of stepping relay 86. Seismic signals thus reproduced from record 92 are applied by way of an amplifier 97 and channel 98 to the input terminal of the galvanometer system for actuating galvanometer 33. By this means a plurality of records, such as record 92, may be mounted on the drum 81 and the signals thereon may be recorded on chart 80 to form a record section which is a composite of a plurality of separate, reproducible seismograms.

The mounting of the galvanometer or other writing element employed in producing the record section on chart 80 will in each case be such as to accommodate the specific writing element employed as understood by those skilled in the art.

It will be appreciated that in the foregoing description the illustrations are to be taken as illustrative. It may readily appear to those skilled in the art that further modifications may be made in the invention and that the establishment of areas of impression on a record storage or receiving medium may be accomplished by means other than galvanometer, pen, or oscilloscope means specifically illustrated and described herein. However, it is intended to cover such modifications as fall within the scope of the appended claims wherein the relation between the zones of impression and the recording or storing medium is set forth with particularity so that those portions of excursions of the seismic signals having a slope of one sense or sign are recorded with emphasis or line width different than those portions whose slopes are of opposite sense or sign.

What is claimed is:

1. A system for recording a time variable function which comprises means for moving a record receiving chart at substantially uniform speed past a recording point, and recording means at the recording point having connections for application thereto of said time variable function and being responsive thereto for producing a line indication on said chart at quiescent points corresponding to quiescent portions of said function and for producing line indications of excursions from said quiescent points which are of different widths for slopes of one sense than for slopes of the opposite sense.

2. The combinaiton comprising a two-dimensional means for receiving and retaining a time variable function for a period at least equal to visual retentivity, means for establishing a writing zone on said two-dimensional means, means for producing relative movement in a first direction between said zone and said two-dimensional means in accordance with time, and means for producing relative movement in a second direction perpendicular to said first direction in accordance with variations in said signal, said zone being characterized by nonsymmetry with respect to a line passing therethrough and extending along said first direction.

3. A two-dimensional means for receiving and retaining a time variable function for a period at least equal to visual retentivity, means for establishing a writing zone on said two-dimensional means, means for producing substantially constant movement in a first direction between said zone and said two-dimensional means in accordance with time, and means for producing relative movement in a second direction perpendicular to said first direction in accordance with variations in said signal, said zone being characterized by nonsymmetry with respect to a line passing therethrough and extending along said first direction whereby the track of said zone across said two-dimensional means varies in width depending upon the sign and magnitude of the slope of said time variable function.

4. A recording system for selective emphasis on a seismogram of indications of subsurface dip which comprises means for moving a recording chart at predetermined speed past a recording zone extending transversely across said chart, means for establishing at least one area of impression on said chart along said recording zone characterized by asymmetry with respect to the direction of movement of said chart for producing lines on said chart, and means for producing movement along said zone of said areas of impression in dependence upon seismic signals.

5. The system set forth in claim 4 in which said area of impression is characterized by a major axis and a minor axis, the latter being displaced from alignment with the direction of travel of said recording chart and toward the direction of dip to be emphasized on said recording chart.

6. The method of recording a time variable function which comprises establishing a zone of impression between a signal transducer and a visual data repository, producing relative movement between said zone and said repository in a first direction in dependence upon time wherein said zone bears a nonsymmetrical relationship with respect to a line oriented parallel to said first direction passing through said zone, and producing relative movement between said zone and said repository in a second direction perpendicular to said first direction in dependence upon variations in said function disproportionately to emphasize excursions of said function in one sense relative to those of opposite sense.

7. The method of recording a time variable function which comprises establishing a zone of impression between a signal transducer and a visual data repository, producing substantially constant movement between said zone and said repository in a first direction wherein said zone bears a nonsymmetrical relationship with respect to a line oriented parallel to said first direction passing through said zone, and producing relative movement between said zone and said repository along a second direction perpendicular to said first direction in dependence upon variations in said time variable function disproportionately to emphasize excursions of said function in one sense relative to those of opposite sense.

8. A system for recording a time variable function which comprises means for moving a photographic record receiving chart past a recording point, and means including a galvanometer system having connections for application thereto of said time variable function and for projecting a beam of light onto said chart, which beam has a cross-section nonsymmetrical with respect to the direction of travel of said chart past said recording point for producing an undulating line exposure on said chart having quiescent points corresponding to quiescent portions of said function and excursions from said quiescent points which are of different widths for slopes of one sense than for slopes of the opposite sense.

9. A system for recording a time variable function which comprises means for moving a photographic record receiving chart past a recording point, a light baffle adjacent said chart having an elongated slit therein which is perpendicular to the direction of movement of said chart, and means including a galvanometer system having connections for application thereto of said time variable function and for projecting a thin rectangular beam of light toward said chart, which beam impinges said slit at an angle producing an area of exposure on said chart which is nonsymmetrical with respect to the direction of movement of said chart for producing a line exposure on said chart at quiescent points corresponding to quiescent portions of said function and for producing line indications of excursions from said quiescent points which are of different widths for slopes of one sense than for slopes of the opposite sense.

10. A system for recording a time variable function which comprises means for moving a photographic receiving chart past a recording point, a source of light for producing a beam of light and comprising a lamp having a long, thin filament, a galvanometer including a mirror and responsive to said function for deflecting said mirror in direction perpendicular to direction of movement of said chart and in extent proportional to the magnitude of said function, means for directing said beam from said light source upon said mirror in a manner askew with respect to the direction of deflection of said mirror, and means including said mirror for reflecting said beam toward and for focusing said beam upon said chart in a manner such that said beam is nonsymmetrical with respect to direction of movement of said chart to produce a line exposure on said chart at quiescent points corresponding to quiescent portions of said function and for producing line indications of excursions from said quiescent points which are of different widths for slopes of one sense than for slopes of the opposite sense.

References Cited in the file of this patent
UNITED STATES PATENTS

| | | |
|---|---|---|
| 2,791,288 | Meier | May 7, 1957 |
| 2,803,515 | Begun et al. | Aug. 20, 1957 |
| 2,837,729 | Houghton | June 3, 1958 |
| 2,840,441 | Owen | June 24, 1958 |
| 2,849,076 | Kaufman | Aug. 26, 1958 |
| 2,928,489 | Perry | Mar. 15, 1960 |